United States Patent

Stacklies et al.

[11] 4,334,748
[45] Jun. 15, 1982

[54] PHOTOGRAPHIC CAMERA LIGHT CONTROLLING APPARATUS

[76] Inventors: Horst Stacklies, Langerstrasse 35, 7080 Aalen 1, Wildbad 5; Achim Schindler, Jenaer Strasse 7, 7082 Oberkochen, Wildbad 5, both of Fed. Rep. of Germany

[21] Appl. No.: 99,687

[22] Filed: Dec. 3, 1979

[30] Foreign Application Priority Data

Dec. 9, 1978 [DE] Fed. Rep. of Germany ....... 2853232

[51] Int. Cl.³ .............................................. G03B 9/08
[52] U.S. Cl. .................................... 354/234; 310/30; 335/79; 335/234; 354/271
[58] Field of Search ...................... 354/234, 235, 271; 310/14, 30, 34, 36, 38; 335/79–81, 234, 183

[56] References Cited

U.S. PATENT DOCUMENTS

| | | | |
|---|---|---|---|
| 3,184,651 | 5/1965 | Albosta | 335/183 X |
| 3,928,988 | 12/1975 | Luth | 335/234 X |
| 4,079,400 | 3/1978 | Kondo | 354/234 |
| 4,113,359 | 9/1978 | Koike et al. | 354/271 X |
| 4,213,689 | 7/1980 | Clapp | 354/234 |

Primary Examiner—John Gonzales

[57] ABSTRACT

Photographic camera light controlling apparatus for driving a light admitting system, comprising
four stator electromagnetic poles defining therebetween an intervening field space containing a linear path, including first and second transversely opposed poles at one path end and third and fourth transversely opposed poles at the other path end, with said first and third poles on one path side and second and fourth poles on the opposite path side,
a field coil mechanism energizable alternately in opposite current flow directions and coordinated to energize said first and fourth poles with one polarity and said second and third poles with the opposite polarity, and alternately vice versa, thereby providing in such field space oppositely polarized electromagnetic fields,
a permanent magnet for driving such system, having its permanent poles arranged transversely of the path and forming a surface magnetized permanent magnet with one permanent pole facing said first and third poles and the opposite permanent pole facing said second and fourth poles, for permitting the magnet to reciprocate along the path from a fully immersed electromagnetic field position between said first and second poles to a like position between said third and fourth poles, and
a corresponding stop at each path end to stop the magnet at a point within the field range of the stator poles at the corresponding path end before reaching said fully immersed position thereat, the magnet having sufficient strength to urge itself toward such position for independent self-retention at such stop after field coil mechanism deenergization.

10 Claims, 13 Drawing Figures

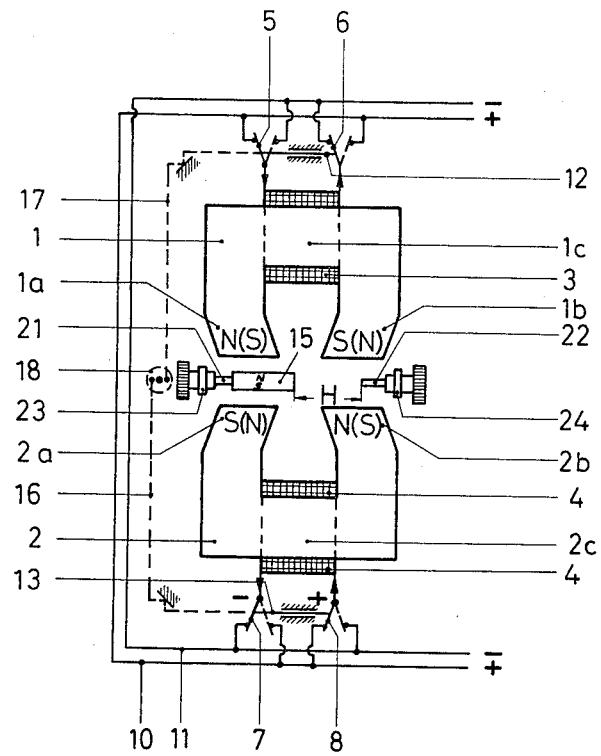
Fig. 1
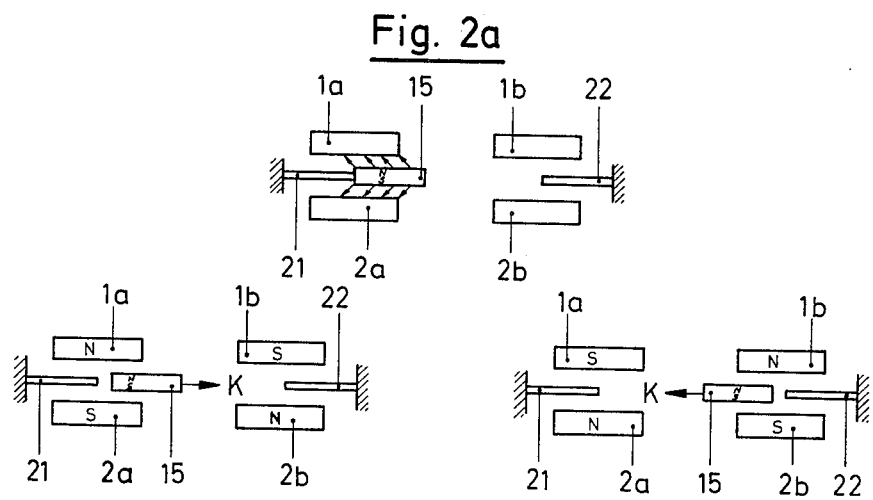
Fig. 2a
Fig. 2b          Fig. 2c

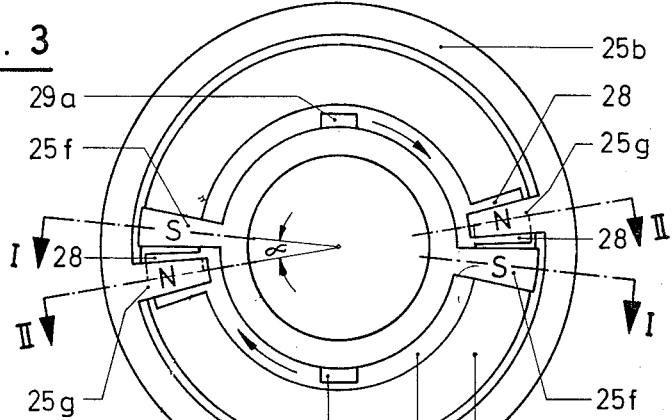
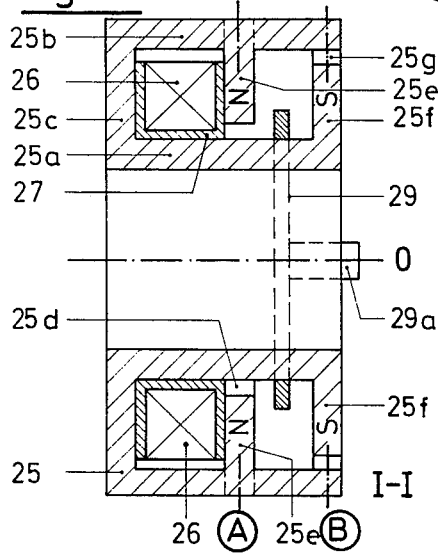
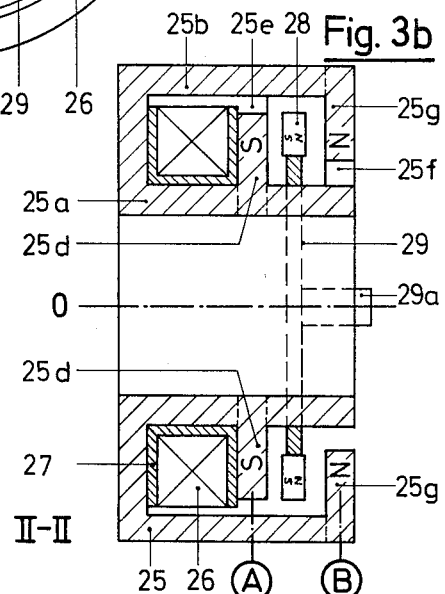
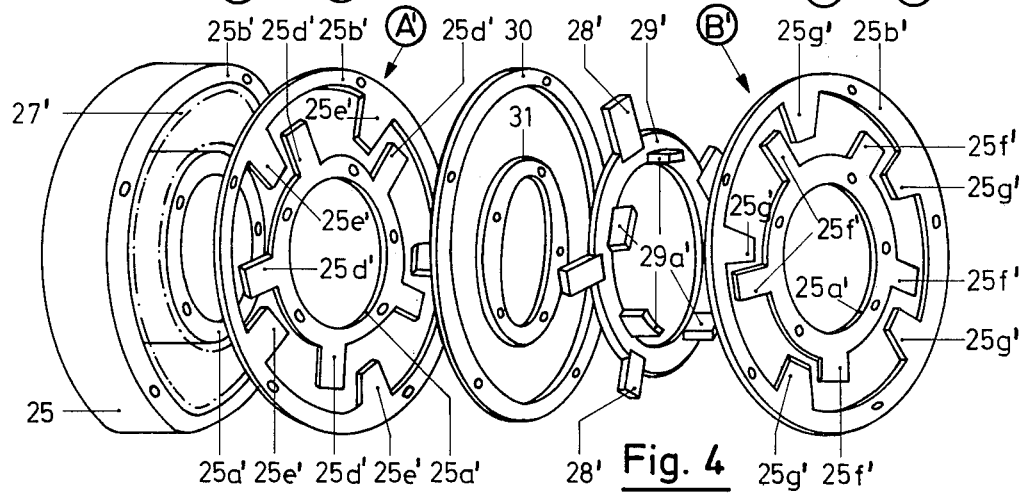

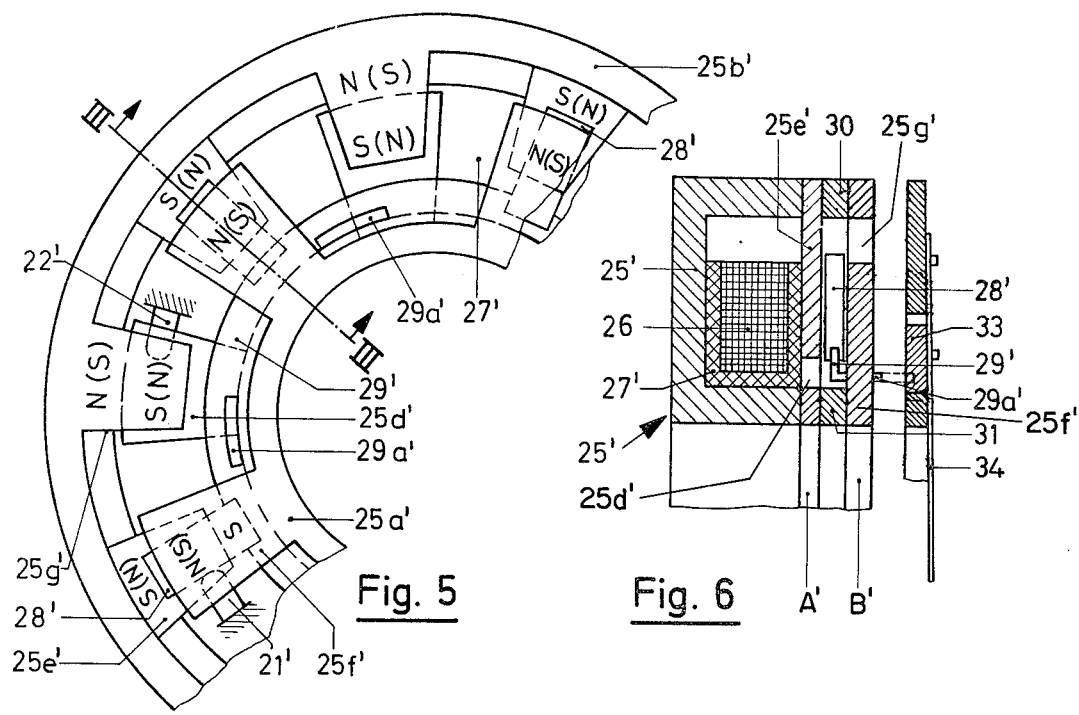
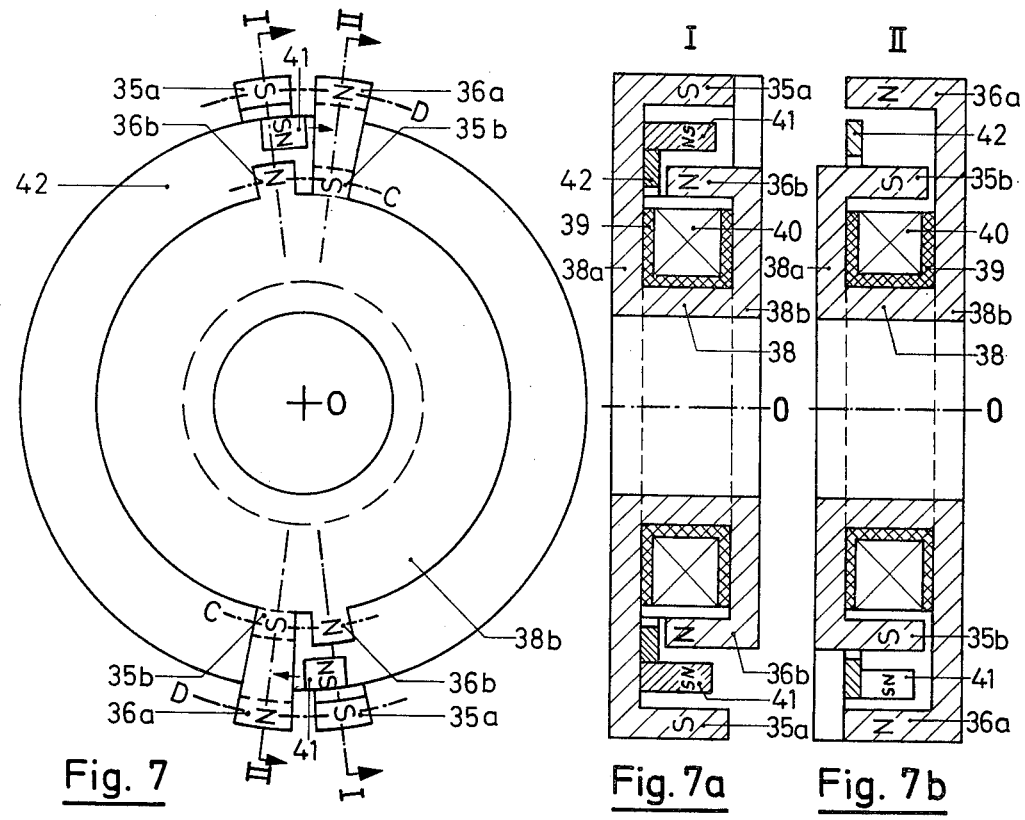

PHOTOGRAPHIC CAMERA LIGHT CONTROLLING APPARATUS

The present invention relates to a light controlling apparatus for a photographic camera assembly of the type having an electro-magnetically drivable light admitting system such as one having diaphragm aperture and/or shutter blades either guided for translatory motion or mounted for rotary motion.

Camera shutters equipped with an electromagnetic drive are known, for instance, from German Pat. No. 2,031,565 which discloses a drive system consisting of a pot magnet and a cylindrical coil which can be coupled to blades of a light admitting system and which is arranged for immersion coaxially to the pot magnet. The corresponding immersion coils and pot magnets of this teaching are arranged in an opposite sense such that the magnetic coils can be operated electrically in opposite directions, or jointly in the same sense, or alternatingly. This known arrangement suffers from the disadvantage that the pot magnet system, coupled to the shutter blade drive ring, must be disposed tangentially to such ring, which results in assembly conditions which cannot readily be met, in practice, if only for the small assembly space available in an objective shutter. It is of further disadvantage, especially as regards inefficiency, in this known electromagnetic drive system that relatively large masses, automatically resulting from the constitution of the system itself, must be moved with great acceleration during the functional cycle.

Also already known is an electromagnetic drive system for objective shutters, in which between two mutually spaced apart toroidal coils coordinated with each other a soft iron core is provided which is disposed concentrically to the toroidal coils, which is guided so as to be axially movable, and which is brought into drive connection with the drive ring of a shutter blade system via a stationarily mounted, dual-armed intermediate lever. Disposed between the toroidal coils lying on a common axis are two permanent magnets each in ring form which are arranged with North-South polarity and whose task it is, among others, to hold the soft iron core, which alternates from its one into its other end position, in the particular end position momentarily assumed by it, i.e. to make certain that the electromagnetically operable shutter blade system retains the corresponding closed or open position reached as a function of the work cycle until the next current pulse is received by the magnet coils. Apart from the fact that a multiplication of the electromagnetic drive and, hand in hand therewith, an increase in the driving force for the actuation of the shutter mechanism is not possible, due alone to the very large space requirement for accomodating this known arrangement, a further disadvantage exists in that, to secure the end position of the soft iron core requires an assembly of additional permanent magnets of ring form which represents an additional but avoidable cost increase in the manufacture of the electromagnetic drive system.

It is among the objects and advantages of the present invention to overcome the above noted drawbacks and deficiencies of the prior art and to provide an electromagnetic drive system characterized by a simple and efficient design, functionally safe and precise operating mode, and high output capacity at low power requirements.

Other and further objects and advantages of the present invention will become apparent from a study of the within specification and accompanying drawings, in which:

FIG. 1 is a schematic view of a basic embodiment showing the principle of the electromagnetic drive system according to the present invention;

FIGS. 2a to 2c are schematic views showing the configuration principle of the electromagnetic stator pole shoes and associated reciprocally movable permanent magnet according to FIG. 1 in various phases of the functional cycle, FIG. 2a illustrating the magnet in contact with one end stop in a rest phase with the field coils not energized, while FIGS. 2b and 2c respectively indicate how the magnet, with the field coils energized, moves with the thrust K in the direction of the corresponding arrow from the position it previously occupied towards the other or opposite end position;

FIG. 3 is a schematic elevational view of a specific embodiment of the electromagnetic drive system with the electromagnetic pole shoes oriented radially relative to the optical axis of an objective shutter, with only two magnet units in diametrically opposed arrangement being shown for the sake of simplicity;

FIG. 3a is a schematic transverse sectional view taken along the line I—I indicated in FIG. 3;

FIG. 3b is another schematic sectional view taken along the line II—II also indicated in FIG. 3;

FIG. 4 is a schematic perspective and exploded view of another electromagnetic drive system according to the present invention consisting, for example, of five magnet units circumferentially arranged in ring form;

FIG. 5 is a schematic partial and enlarged top view of the electrodynamic drive system shown in FIG. 4;

FIG. 6 is a schematic sectional view of the magnetic drive system taken along the line III—III of FIG. 5;

FIG. 7 is a schematic view of another embodiment of an electromagnetic drive system with magnet units arranged so as to extend concentrically or axis parallel relative to the optical axis of the shutter;

FIG. 7a is a schematic sectional view of the arrangement taken along the line I—I indicated in FIG. 7, and FIG. 7b is a schematic sectional view taken along the line II—II indicated in FIG. 7.

According to the present invention, an assembly is provided for driving the blades of a camera shutter, including at least two stator pole pairs of soft-magnetic material which are disposed opposite each other with mutual spacing and with which is coordinated at least one field coil through which current is able to flow alternately in the one or the other direction, whereby to build up in the corresponding pole shoes of the stator pole pairs, in the alternation of the current flow direction, oppositely polarized magnetic fields.

Moreover, between the pole shoes of the pole pairs a surface-magnetized or transversely N-S pole oriented permanent magnet is guided so as to be movable back and forth, under the limiting influence of coordinated mechanical stops which terminate the motion of the permanent magnet in the one as well as in the other direction before it reaches the actual end position otherwise attainable field-electrically by electromagnetic action.

An electromagnetic drive system equipped with these features according to the present invention is characterized above all by a relatively simple design, readily able to be accommodated in the annular space of a shutter housing and for efficient interaction with the blade system of a shutter, and also by a high output capacity at low power requirements.

Another advantage of the instant invention is that holding means such as additional permanent magnets, barriers or the like, otherwise required to fix the member of the magnetic drive performing reciprocating motions in its respective end position, can be omitted due to the fact that the contemplated surface-magnetized permanent magnet is stopped in accordance with the instant arrangement before it reaches the end position it would have entered had it not been inhibited by the mechanical stops. Due to the selective coordination of the end stops according to the present invention, the permanent magnet is provided with an unequivocal and absolutely stable end position, out of which it can always move yet only in the direction towards the alternative end position and only upon the energization of the field coils in the opposite functional direction.

In order to be also able to achieve short exposure times, such as in the order of 1/500 sec., with camera shutters of the type having an electromagnetic drive, i.e. with respect to the high thrusts which must be expected of such a drive, advantageously according to the present invention, a multiplicity of stator pole pairs formed of soft-magnetic pole shoes and, in agreement with them, a corresponding number of permanent magnets matching the number of concordant pole pairs are provided to serve as the drive system for the system of shutter blades or the like.

In advantageous specific development of this arrangement, it is further provided, according to the present invention, that two stationary soft iron parts of linear or ring shape, serve correspondingly to form stator pole pairs. The soft iron parts, which are respectively provided with pole shoes lying substantially in one common plane, are coordinated with each other so that the pole shoes formed on the respective soft iron part mesh with each other in a positional orientation similar to gears. In turn, another reciprocally movable part, equipped with permanent magnets and serving for the actuation of the shutter blades or the like, is guided so as to be movable in precise selective manner back and forth between the two soft iron parts under electromagnetic influence.

Thus, the operating principle according to the present invention provides an electrodynamic drive system arrangement advantageous in both structural and functional respect, especially for photographic objective shutters.

In particular, this may be achieved by providing one each inner and outer stator pole ring, lying in the same assembly plane A and B, respectively, and correspondingly equipped with radially oriented pole shoes, concordantly arranged such that the corresponding pole shoe of the outer ring lying in the assembly plane B is coordinated with the cooperating pole shoe of the inner ring lying in the assembly plane A, and such that the corresponding pole shoe of the inner ring lying in the assembly plane B is coordinated with the cooperating pole show of the outer ring lying in the assembly plane A.

According to the present invention, advantageous assembly conditions for the instant electromagnetic drive system can be provided in objective shutter assemblies of the type containing an objective lens system having a relatively large light admitting aperture, by arranging the pole shoes of the stator pole pairs formed on the annular soft iron parts and the permanent magnets respectively coordinated with them in cooperative cumulative association, so as to extend radially relative to the optical axis of the shutter system.

On the other hand, a magnet system of the instant type may alternatively be provided whose pole shoes are formed on annular stator soft iron parts and whose permanent magnets are similarly arranged to form in cooperative cumulative association a concentric system aligned parallel to the optical axis of the shutter assembly, and which is better suited for objective shutters where a short structural length axially is of greater importance than a large aperture.

In order to achieve with relatively simple structural means a certain adaptability of the reciprocal stroke length of the surface-magnetized permanent magnet to the appropriate travel distances of a given shutter blade system to be driven, according to the present invention, the stationary stops limiting the range of motion of the corresponding permanent magnet are advantageously formed selectively adjustable in design.

A simple and space-saving electromagnetic drive system design, which is particularly well suited for assembly in an objective shutter system may also be achieved according to further feature of the present invention, by designing the field coil in the form of a toroidal coil such that the housing provided to receive such coil also forms the return path for the current flow there through.

Referring to the drawing, as the schematic diagram of FIG. 1 shows, the instant electrodynamic drive or light controlling apparatus in its simplest design may consist of two stator parts 1 and 2, preferably made of soft-magnetic material (e.g. flat or round stock) and preferably of U-shape, whose legs, constituting stator pole means, e.g. formed as stator pole shoes, are coordinated with each other in mirror fashion and with a certain mutual spacing so that two pole means each, such as pole shoes 1a, 2a and 1b, 2b, respectively, are directly opposite each other. Field coil means such as in the form of field coils 3 and 4 are mounted on the respective cross bar, forming a magnet core, 1c, 2c, respectively, of the U-shaped soft iron parts 1 and 2.

As shown in FIG. 1 by way of example, field coils 3 and 4 are alternately connectable to current-carrying lines 10 and 11 by means of appropriate switch means such as switches 5, 6 and 7, 8, respectively, so that, depending on the switch position, current from a conventional power source (not shown) flows through the field coils either in the one or in the other direction.

Only for the sake of completeness and for better understanding, simple mechanical means such as in the form of conventional sliding coupling rods 12 and 13 serving to actuate the switches and further mechanical transmission means 16 to 18, shown in broken lines, for the actuation of these rods, are indicated symbolically in FIG. 1. In practical application, i.e. for more efficient realization of the electrodynamic drive system according to the invention, electrical or electronic switches (not shown), known per se, are preferably used rather than mechanical switch means for the purpose of reversing the current flow direction.

In any case, the particular switch means are expediently designed so that when the field coils 3 and 4 are energized in the one or other current flow direction, electromagnetic fields are set up in the two opposite pole shoes or poles 1a, 2a and 1b, 2b, respectively, the field lines or induction lines of which are oppositely directed and depend on the respective current flow direction, as the artisan will appreciate.

For instance, if a north pole "N" is set up in the first pole means or pole shoe 1a upon the energization of the field coil 3 according to the switch position shown in FIG. 1, the second pole means or pole shoe 2a opposite the first pole means must form the south pole "S". Vice versa, if in the same switch position the third pole means or pole shoe 1b is a south pole "S", the fourth pole means or pole shoe 2b opposite the third pole means must represent the north pole "N".

Upon a polarity reversal of the coils 3 and 4, effected by repositioning the mechanical switches 5 to 8 into the switch position as shown in broken lines in FIG. 1, the current flow directions changes, and with such reversal of the current flow the polarization state is correspondingly changed in the above mentioned four pole means or pole shoes, the first pole means or pole shoe 1a now being a south pole "S" and the second pole means or pole shoe 2a opposite the first now being a north pole "N", while the third pole means or pole shoe 1b in turn now represents the north pole "N" and the fourth pole means or pole shoe 2b the south pole "S", in the electromagnet systems 1, 3 and 2, 4 respectively. This reverse polarization is also indicated in FIG. 1 in each instance by the appropriate polarity in parentheses.

By coordinating with the above described stator pole shoe pairs 1a, 1b and 2a, 2b, respectively, a surface-magnetized permanent magnet 15 in such a manner that its "N"-polarized side surface faces the first and third pole shoes or pole pair 1a, 1b while the "S"-polarized side surface of such permanent magnet faces the second and fourth pole shoes or pole pair 2a, 2b, a magnet system or assembly is provided whose operative principle is suited in advantageous manner for purposes of driving parts or mechanisms which, to carry out their functions, perform a reciprocating motion. This includes, for instance, driving the opening and closing system and/or the aperture system of a photographic shutter, and that for a slide shutter blade system guided for translatory motion as well as for objective shutter systems mounted for rotary motion (cf. FIG. 6).

In the first mentioned case, the permanent magnet 15 may be disposed indirectly or directly on a drive member for actuating the slider of a focal plane shutter in conventional manner, and in the other case, for instance, on a drive member mounted rotatably and concentrically to the optical axis of an objective shutter and serving to drive shutter or aperture blades in conventional manner. However, it is an important condition, as is known, that this drive member be guided so as to be movable easily or that it be mounted suitably so that a low voltage power source in the order of only a few volts, such as 12 or 24 V, is sufficient to move the permanent magnet 15 with optimumly great acceleration across a relatively short distance along a reciprocal linear path from one end position into the other, e.g. whereby to move the opening and closing system of a shutter in operative drive connection with the permanent magnet from the covered into the open position and back again into the covered position.

As may be seen from FIG. 1, there are coordinated with the surface-magnetized permanent magnet 15 stationarily disposed corresponding stop means such as end stops 21 and 22, e.g. of non-magnetic and non-conductive material, and in such a manner that the corresponding stop means terminate the rundown motion of the permanent magnet 15 in the one as well as in the other direction before the magnet has reached the actual end position which is field-electrically attainable by such magnet 15 thereat. This means the final operative field position the permanent magnet 15 would assume if it had been allowed to immerse fully into the electromagnetic field of those opposing coacting pole shoes 1a, 2a or 1, 2b towards which it had been moving. However, this is prevented in accordance with the present invention by the travel-limiting stops required anyway for the definite determination of the end position of the permanent magnet 15.

If, as already explained, these stops 21 and 22 are arranged so that they inhibit the permanent magnet 15 from completely immersing in the electromagnetic field of the stator pole pairs respectively coordinated with each other at the corresponding ends of the reciprocal path, then it is likewise accomplished that the magnet, and at the same time the driving member with which it is in drive connection, will remain in the end position determined by the respective stop. Hence, special holding means such as barriers or the like are rendered completely unnecessary.

On a physical basis, as shown in FIG. 2a, this effect is due to the fact that the magnet 15 under its own inherent magnetic force tries to assume a fully immersed electromagnetic field position transversely between or opposite the stationary first and second poles or pole shoes 1a, 2a at one end of the reciprocal path or the stationary third and fourth poles or pole shoes 1b, 2b at the other end of such reciprocal path, in which the field lines of its permanent magnetic field find the shortest field path or course to the pole shoes.

By making the end stops 21 and 22 selectively adjustable, as also schematically shown in FIG. 1, such as by designing them in the manner of a set screw, for instance, and disposing them so that they can be screwed into a stationary part 23 or 24, respectively, an adaptability is advantageously provided which makes it possible to vary the respective point in the reciprocal path at which the corresponding movement of the permanent magnet 15 is stopped and in turn to adjust the stroke or reciprocal amplitude H of the permanent magnet 15 precisely to the specific travel conditions of the corresponding blade system to be driven.

The advantages provided by the electromagnetic drive system of the present invention as described above are evident from and are founded, above all, in the fact, among others, that the magnetic flux in the pole shoes can be conducted to that particular point where the greatest effect with respect to achieving a great thrust K to move the permanent magnet at low power requirements is attainable. Accordingly, the electromagnetic drive principle according to the present invention can also be applied to those photographic shutters, of which maximum shutter speeds of 1/500 sec. are demanded.

Another noteworthy advantage of the above described electromagnetic drive system is based on the further fact that additional holding means for fixing the permanent magnet in its rest position at either end of the reciprocal linear path can be omitted because its own inherent permanent magnetic field strength suffices independently to hold it, and the mechanisms to be driven by it, in the selected end point position attained even after deenergization of the field coils. Also, the respective end stop gives to the permanent magnet in its rest position at the corresponding end of the linear path an unequivocal location because it can leave this position only in the direction towards the opposite stop and only upon alternate energization of the field coils in the opposite current flow direction and with the permanent magnet under the influence of the one magnetic field repelling it and under the influence of the other magnetic field exerting an attracting force on it.

The operating mode of the electromagnetic drive principle of the instant assembly is as follows:

When a current from a conventional power source, not detailed in FIG. 1, flows through the two field coils 3 and 4 in the switch position according to FIG. 1 in the direction indicated therein by arrows, establishing at the stator pole pairs 1a, 1b and 2a, 2b and N-S or S-N polarization depending on the current flow direction, the permanent magnet 15 in contact with the end stop 21 will be repelled by the electromagnetic field of those pole shoes 1a and 2a between which the magnet stands at the moment of energization of the field coils 3 and 4, and in turn will be attracted by the oppositely polarized electromagnetic field of the pole shoes 1b and 2b. Consequently, permanent magnet 15 starts to move with relatively great acceleration (FIG. 2b), approaches the stator pole pair 1b, 2b, eventually striking the end stop 22, whereby its rundown motion is terminated prematurely, i.e. before the permanent magnet reaches its normal maximum or fully immersed electromagnetic field position transversely between the opposed third and fourth poles or pole shoes 1b and 2b. Upon temporary interruption of the current supply to the field coils 3 and 4, which then takes place, the residual magnetism or inherent magnetic field strength of the permanent magnet 15 remains intact in the position thus assumed and independently causes the magnet to retain the end position assumed, even pulling it into this position, as it were.

When, subsequent to this process, the switches 5,6 and 7, 8, respectively, are switched by actuating the mechanical actuating device 16 to 18 after a given longer or shorter time delay as the case may be, i.e. are brought into the contact position indicated by broken lines in FIG. 1, reenergization takes place and the current flow direction in the field coils 3 and 4 is reversed, setting up in the pole shoes 1a, 1b and 2a, 2b, respectively, an electromagnetic field in each instance whose field lines are opposed to those of the previous one, whereby the polarization according to the polarity data in parentheses now exists in the pole shoes. As a result, the permanent magnet 15 is repelled by the stator pole pair 1b, 2b and attracted by the pole pair 1a, 2a (FIG. 2c). The permanent magnet 15 in its reverse motion finally strikes the end stop 21 again to stay in this position even after the current supply to the field coils 3 and 4 is once more interrupted. Likewise, the electromagnetically actuated movement of the permanent magnet in this return direction is terminated by the stop before reaching its normal maximum or fully immersed electromagnetic field position transversely between the opposed first and second poles or pole shoes 1a and 2a.

The mechanical actuating device 16 to 18 can be made to return to its setting shown in FIG. 1 after the energization of the field coils 3 and 4 is first interrupted, i.e. by actuating an ON/OFF switch (not shown) disposed in the lines 10, 11 in conventional manner.

As may be appreciated from the embodiment as exemplified in FIG. 3, and especially FIGS. 3a and 3b, the arrangement of the electrodynamic drive assembly or principle of the present invention, for example for the purpose of actuating the aperture blades or shutter blades of a photographic objective shutter may be provided such that the field coil means includes a toroidal coil 26 which is coordinated with and preferably disposed in a return path part or housing 25 of cylindrical or potlike design. Part 25 is appropriately made entirely or partially of magnetically well-conductive material such as soft iron or the like, and forms a magnetic flux return flow path for the current through the coil 26.

The toroidal coil 26, whose windings are preferably suitably embedded in a cage 27 consisting of magnetically non-conductive material, is expediently disposed in an annular chamber formed by an inner ring or tube 25a, an outer ring or tube or peripheral surface 25b, and an annular rear wall or radial surface 25c of the return path part 25.

In a first radial ring zone or assembly plane A which axially limits the space in which the toroidal coil 26 is accommodated, the inner tube 25a constituted as one stator component in each instance has, relative to the optical axis O of the photographic camera, the first stator pole means, e.g. formed as a stator pole shoe 25d, oriented to extend radially outwardly, and the cylindrical outside diameter peripheral surface or outer tube 25b constituted as another stator component correspondingly has the third stator pole means, e.g. formed as a stator pole shoe 25e, oriented to extend radially inwardly, the two pole shoes being coordinated in offset relation with each other, as seen in circumferential direction, at an angular spacing $\alpha$(FIG. 3) adequate for the stroke of the permanent magnet in its reciprocal movement along the given linear path.

In addition to the first and third pole means or pole shoes 25d and 25e in each instance in the first ring zone or assembly plane A, the inner tube 25a and the outside diameter peripheral surface or outer tube 25b of the return path part 25 each have another stator pole means correspondingly formed as the fourth and second stator pole means or pole shoes 25f and 25g which are respectively oriented to extend radially outwardly and radially inwardly. Fourth pole shoe 25f and second pole shoe 25g are disposed in a second radial ring zone or assembly plane B axially removed a certain distance from the first mentioned plane A, and are also coordinated in offset relation with each other in each instance at such angular distance or spacing $\alpha$.

Accordingly, the four stator pole means or pole shoes located in the two radial ring zones or assembly planes A and B in each instance are arranged so that, as seen in axial direction, the first pole shoe 25d is directly opposite the second pole shoe 25g at one end of the pertinent reciprocal linear path, and the third pole shoe 25e is correspondingly directly opposite the fourth pole shoe 25f at the other end of such path.

Thus, the pole means or pole shoes coordinated with each other in pairs form in each instance a corresponding magnetic unit or set of four stator pole means or pole shoes, with each such set being diametrically opposed to the other and respectively having a surface-magnetized permanent magnet 28, corresponding to permanent magnet 15 as provided in the electromagnetic drive assembly or principle embodied in the arrangement according to FIG. 1.

Both correspondingly diametrically opposed permanent magnets may be fastened for common movement to a ring or drive member 29 which is rotatably mounted on the inner tube 25a and provided with axially oriented drivers or arms 29a with which the drive member 33 of an objective shutter assembly as the light admitting system to be actuated can be brought into operative drive connection indirectly or directly, as indicated in FIG. 6.

As to the particular design and arrangement of the toroidal coil 26, it is selected so that, when energized, for each unit or set of four stator pole means or pole shoes, a magnetic field of opposite N-S polarization is built up in the respective stator pole pair formed of pole shoes transversely opposing each other axially at each linear or circumferential end of the reciprocal path. Such opposite N-S polarization also occurs in the respective stator pole pair formed of pole shoes linearly opposing each other on the same lateral side of the linear path.

More specifically, for each respective unit or set of four stator pole means or pole shoes distributed in diametrically opposed or circumferentially spaced apart relation relative to the next such unit or set, the first pole shoe 25d and second pole shoe 25g in transversely or axially opposed relation in the corresponding ring zones or assembly planes A and B will always be charged with opposite polarity and the third pole shoe 25e and fourth pole shoe 25f in transversely or axially opposed relation in such ring zones or planes A and B will likewise be charged with opposite polarity. At the same time, the first and third pole shoes 25d and 25e in linearly or circumferentially opposed relation adjacent each other in the same ring zone or plane A will always be charged with opposite polarity, and the same opposite polarity will always occur for the second and fourth pole shoes 25g and 25f in linearly or circumferentially opposed relation adjacent each other in the same ring zone or plane B.

It will be seen that the reciprocal paths for the permanent magnets 28 respectively distributed in diametrically opposed or circumferentially spaced apart relation relative to the next unit or set are linear paths which are suitably arcuate or curved linear shaped paths axially bounded by ring zones or planes A and B and radially bounded by rings or tubes 25a and 25b.

In FIG. 4 is shown another embodiment of the electromagnetic drive system in a perspective view which exemplifies the present invention, and which, regarding design and operating mode, is identical in principle with the concept shown in FIG. 3. For this reason, the same reference symbols are used in FIG. 4 for the corresponding essential components of the electromagnetic system, but here additionally designated as prime numerals.

For reasons of economical production, the third and first pole shoes 25e', 25d' and the fourth and second pole shoes 25f', 25g' are formed on separate rings 25a' and 25b', respectively, as the case may be. These rings 25a', 25b' and 25a', 25b' are fastened by screws or the like to the return path part 25' to form a unitary housing which accommodates the toroidal coil 26', as a composite together with the two interposed spacer and mounting rings 30 and 31, whereby to provide the corresponding intervening assembly space or electromagnetic field space for a drive ring 29' equipped with permanent magnets 28' (see FIG. 6).

A total of, for example, five pole means or pole shoes are evenly distributed over the circumference of each one of the pole rings 25a' and 25b'. The coordination of the inner and outer rings 25a' and 25b' respectively lying substantially in one common, disc shaped, ring zone or plane A' or B' as the case may be, is such that their pole shoes are circumferentially offset and radially mesh in the manner of gears.

On the other hand, in axial direction, the respective pole shoes are aligned relative to each other so that, as is clearly evident from FIG. 5, the first ring zone or plane A'-assigned corresponding first pole shoe 25d' formed on the first inner ring 25a' to extend in radially outwardly facing direction is directly opposite the second ring or plane B'-assigned corresponding second pole shoe 25g' formed on the second outer ring 25b' to extend in radially inwardly facing direction. Likewise, the corresponding third pole shoe 25e' located on the first outer ring 25b' of such first plane A' and formed to extend in radially inwardly facing direction is directly axially opposite the corresponding fourth pole shoe 25f' of the second inner ring 25a' of the second plane B' and formed to extend in radially outwardly facing direction. This positioning relationship of the four pole means of each unit or set may be seen particularly clearly in FIGS. 5 and 6 which show the electromagnetic drive system partially in larger scale and in transverse section.

Additionally, as shown in FIG. 6, light admitting system ring or drive member 33 which drives the diaphragm aperture blades and/or shutter exposure blades 34 for admitting photographic light to the camera along the optical axis O in the usual manner can be brought into drive connection operatively with the permanent magnet drive member or ring 29'.

Particularly indicated in FIG. 5 are the corresponding N and S polarizations appearing in the various pole shoes upon the energization of the toroidal coil 26', the data in parantheses, i.e. (N) and (S), here also indicating the alternative polarization after the reversal of the given polarization or current flow direction through the electromagnetic coil means.

In the above described embodiment exemplifications according to FIGS. 3 to 6, the pole shoes and the permanent magnets are coordinately and cooperatively disposed to extend in radial or perpendicular direction in relation to the optical axis O of the photographic objective shutter assembly with which the apparatus of the present invention is usable. Hence, this spatially oriented concept may be referred to as a radial arrangement.

The embodiment in the example according to FIG. 7 illustrates another advantageous pole means or pole shoe coordination arrangement, which may be referred to as an axial arrangement. Here, the pole means or pole shoes 35a, 35b and 36a, 36b, mutually coordinated in pairs and stationarily disposed, are located in two different peripheral or circumferential ring zones or planes C and D which are oriented so as to extend concentrically or in axisparallel relation to the objective axis O.

Analogous to the embodiment in the example shown in FIG. 3, and especially in FIGS. 3a and 3b, the stator pole pair comprising the third and fourth pole shoes 35a and 36b, and the stator pole pair comprising the first and second pole shoes 36a and 35b, respectively, are formed on a common ring part 38 made of soft iron of U-shaped cross section whose radially oriented and axially spaced apart ring components constituted as ring walls or surfaces 38a and 38b form therewith a housing or assembly space for the toroidal coil 40 embedded in a cage 39 which consists of magnetically non-conductive material.

Coordinated with each of the two stator pole pairs 35a, 36b and 36a, 35b, respectively, is a corresponding surface-magnetized permanent magnet 41, each formed like permanent magnet 15 (FIG. 1) and permanent magnets 28 and 28' (FIGS. 3 and 4), with both sitting on a drive ring 42 rotatably mounted concentrically to the objective axis O for common reciprocal movement of the permanent magnets 41 along the corresponding linear path.

The windings of the toroidal coil 40 are connected to current-carrying lines (not shown) of a power source and, in order to make possible a reversal of the current flow direction in the toroidal coil, as in the other embodiments, also to a circuit (not shown) which influences the coil 40 so that the permanent magnets 41 alternately perform reciprocating motions from the one stator pole pair 35a, 36b to the other stator pole pair 36a, 35b and back again between the corresponding ends of the respective linear path.

Advantageously, the concept of the electromagnetic drive system as shown in FIGS. 7, 7a and 7b may be efficiently utilized whenever the objective system with which a shutter assembly is to be equipped has a relatively small light admitting aperture and especially where for appropriate reasons the shutter assembly is required to have an optimumly short axial structural length. Hence, the pole means and permanent magnets are coordinately and cooperatively arranged to extend in axial direction in relation to the optical axis O. This concept will also be preferred whenever the part driving the diaphragm aperture blades and/or shutter exposure blades of the light admitting system should be unhampered by the effect of noteworthy mechanical forces acting in the direction of the objective axis of the camera, as the artisen will appreciate.

In this regard it will be appreciated that with respect to each unit or set of four stator pole means, the first and second pole shoes 36a and 35b are disposed in transversely or radially opposed facing relation at one linear or circumferential end of the corresponding linear or arcuate path bounded between the concentric ring zones or curved linear planes C and D, and that the third and fourth pole shoes 35a and 36b are correspondingly disposed in transversely or radially opposed facing relation at the other or opposite linear or circumferential end of such linear or arcuate path. Also, the first and third pole shoes 36a and 35a are disposed in linearly or circumferentially spaced apart relation on one lateral side of the linear path more or less lying in the common circumferentially outer ring zone or curved linear plane D, and the second and fourth pole shoes 35b and 36b are correspondingly disposed in linearly or circumferentially spaced apart relation on the other or opposite lateral side of the linear path more or less lying in the common circumferentially inner ring zone or curved linear plane C.

Hence, the four pole shoes of each set define an intervening field space containing the linear path along which the corresponding permanent magnet 41 is movable on the common drive ring or member 42 for actuating the light admitting system of the camera (FIG. 6). The toroidal coil 40 disposed in cage 39 and mounted in the housing, as constituted by the ring part 38 together with the ring shaped components 38a and 38b, and which forms a corresponding magnet flux return flow path for the current through such coil, advantageously provides electromagnetic field coil means for coordinate energizing of the four pole shoes of each such set, respectively.

It will be appreciated that the first and fourth pole shoes 36a and 36b are disposed on the one common stator ring shaped component 38b, and that the second and third pole shoes 35b and 35a are disposed on the other common stator ring shaped component 38a which is axially spaced from component 38b.

The corresponding stop means (not shown) at each end of the linear path in the embodiment of FIG. 7 are positioned in the same manner as the stop means 21' and 22' (FIG. 5) in the embodiment of FIGS. 4 to 6 and for the same purposes, as the artisan will appreciate. The same is true of the stop means (not shown) in the embodiment of FIGS. 3, 3a and 3b. In all cases, the stop means at each end of the appropriate linear path in question are preferably selectively adjustable (see FIG. 1) to vary the respective point in the path at which the corresponding movement of the particular permanent magnet is stopped.

Accordingly, the present invention provides an advantageous, energy efficient, economical, precise and long wearing photographic camera light controlling apparatus adapted for electromagnetically driving a light admitting system of the type having diaphragm aperture blades and/or shutter exposure blades which are guided for translatory motion or mounted for rotary motion to admit photographic light to the camera along the optical axis thereof.

The instant apparatus broadly comprises stator electromagnetic pole means, field coil means, permanent magnet means constituted as surface magnetized permanent magnet means and selectively positioned stop means.

More specifically, the stator electromagnetic pole means contemplate at least one set of four spaced apart stator electromagnetic pole means correspondingly defining therebetween an intervening field space containing a linear path, and including for each such corresponding set first and second transversely opposed stator pole means disposed at opposite lateral sides of such path at one linear end of the path and third and fourth transversely opposed stator poles means disposed at opposite lateral sides of such path at the other or opposite linear end of the path and linearly or longitudinally spaced from the first and second pole means.

The four pole means are thereby arranged such that the linear path extends from the first and second pole means at the one end of the path to the third and fourth pole means at the other end of the path and is laterally bounded on one transverse side of the path by the first and third pole means and on the opposite transverse side of the path by the second and fourth pole means.

Preferably, the four pole means are the same in size, shape and constitution, and are especially arranged with the first and fourth pole means being correspondingly transversely equidistant from the second and third pole means and with the first and second pole means being correspondingly linearly or longitudinally equidistant from the third and fourth pole means.

The field coil means are provided for electromagnetically energizing the four pole means and are arranged for energization alternately in one current flow direction and in the other or opposite current flow direction and in turn are coordinated, e.g. as to the correspondingly appropriate associated coil winding direction, with the corresponding stator set of four pole means to energize the first and fourth pole means with one polarity (e.g. North) and the second and third pole means with the opposite polarity (e.g. South) and alternately to energize the first and fourth pole means with such opposite polarity (e.g. South) and the second and third pole means with such one polarity (e.g. North).

In this way, oppositely polarized corresponding electromagnetic fields are thereby provided in the intervening field space containing such linear path and such fields are generated in concordance with the change in current flow direction of the field coil means.

The permanent magnet means contemplates a movable permanent magnet adapted for operative driving connection with the light admitting system or assembly used to admit photographic light to the camera, and arranged with respect to the corresponding stator set for reciprocal movement along the linear path between the four stator pole means.

Specifically, the permanent magnet has the corresponding North and South permanent magnet poles thereof arranged in opposed relation to each other transversely of the linear path and forms and constitutes a surface magnetized permanent magnet with one permanent magnet pole facing toward the corresponding first and third pole means and the opposite permanent magnet pole facing toward the corresponding second and fourth pole means.

Accordingly, the permanent magnet is permitted to move reciprocally linearly or longitudinally, i.e. perpendicularly to the transverse North to South orientation of the permanent magnet poles thereof, between a fully immersed electromagnetic field position transversely between the corresponding first and second pole means at one end of the path and a fully immersed electromagnetic field position transversely between the corresponding third and fourth pole means at the other end of the path.

The stop means contemplate one stop means or stop in the vicinity of the corresponding first and second pole means at the one end of the path and another stop means or stop in the vicinity of the corresponding third and fourth pole means at the other end of the path.

Such corresponding stop means are arranged to stop the movement of the corresponding permanent magnet in the corresponding movement direction at a selective corresponding point in the path within the operative range of the electromagnetic field of the transversely opposed pole means at the corresponding end of the path thereat and prior to the reaching of the fully immersed position of the permanent magnet transversely between the opposed pole means at that corresponding end of the path.

The corresponding permanent magnet in particular has sufficient magnetic field strength to urge itself toward such fully immersed position at the respective stop means and thereby independently to self-retain its disposition thereat even after deenergization of the field coil means. Suitably, a plurality of units or sets of such four corresponding spaced apart stator electromagnetic pole means may be provided for defining a corresponding plurality of such field spaces and paths, with the field coil means being arranged for correspondingly coordinately electromagnetically energizing the four pole means of each such set. In turn, a corresponding plurality of such permanent magnets suitably arranged for common reciprocal movement may be likewise provided respectively for such sets of four pole means.

Of course, since the permanent magnets are arranged for common reciprocal movement, only one common pair of stop means will normally be provided to limit the reciprocal stroke of the simultaneously moving permanent magnets and the end points of movement thereof in relation to the corresponding fully immersed electromagnetic field position of the respective permanent magnets at the respective transversely opposed pole means (cf. FIG. 5).

In any case, each corresponding stop means or stop is preferably selectively adjustable to vary the respective point in the path at which the corresponding movement of the permanent magnet is stopped relative to the appropriate fully immersed electromagnetic field position which is never to be reached.

In accordance with a favorably preferred feature of the present invention, two ring shaped soft iron stator components may be provided, such that the units or sets of stator pole means are formed correspondingly on the stator components in circumferentially spaced apart relation.

More particularly, the first and fourth pole means of each set may be suitably provided in spaced apart disposition on one component (e.g. pole shoes 25d and 25f on tube component 25a in the embodiment of FIGS. 3, 3a and 3b; pole shoes 25d' and 25f' on composite ring component 25a', 31, 25a' in the embodiment of FIGS. 4 to 6; and pole shoes 36a and 36b on wall component 38b in the embodiment of FIGS. 7, 7a and 7b).

In turn, the second and third pole means of each set may be suitably provided in spaced apart disposition on the other component (e.g. pole shoes 25g and 25e on surface component 25b in the embodiment of FIGS. 3, 3a and 3b; pole shoes 25g' and 25e' on composite ring component 25b', 30, 25b' in the embodiment of FIGS. 4 to 6; and pole shoes 35b and 35a on wall component 38a in the embodiment of FIGS. 7, 7a and 7b).

Consequently, the first and third pole means will lie substantially in one common plane (e.g. pole shoes 25d and 25e in radial plane A in the embodiment of FIGS. 3, 3a and 3b; pole shoes 25d' and 25e' in radial plane A' in the embodiment of FIGS. 4 to 6; and pole shoes 36a and 35a in outer curved circumferential or cylindrical plane D in the embodiment of FIGS. 7, 7a and 7b).

In turn, the second and fourth pole means will lie substantially in another common plane spaced from the one plane and disposed in corresponding opposed facing relation to the first and third pole means thereat (e.g. pole shoes 25g and 25f in radial plane B spaced axially from plane A and in facing relation to pole shoes 25d and 25e in the embodiment of FIGS. 3, 3a and 3b; pole shoes 25g' and 25f' in radial plane B' spaced axially from plane A' and in facing relation to pole shoes 25d' and 25e' in the embodiment of FIGS. 4 to 6; and pole shoes 35b and 36b in inner curved circumferential or cylindrical plane C spaced radially inward from plane D and in facing relation to pole shoes 36a and 35a in the embodiment of FIGS. 7, 7a and 7b).

Such arrangement of stator components containing the corresponding sets of four pole means thereon will thereby define the corresponding field space for each set therebetween and which contains the corresponding linear path.

In conjunction therewith, a drive member is favorably provided which is adapted for direct or indirect operative driving connection with the light admitting system or assembly used to admit photographic light to the camera. In particular, the drive member is arranged for corresponding reciprocal movement and the permanent magnets in concordant plurality to the sets of four pole means are mounted on the drive member in corresponding circumferentially spaced apart relation for common reciprocal movement respectively between the corresponding sets of four stator pole means along the corresponding linear paths.

In accordance with a particularly preferred feature of the present invention, the stator components are substantially concentrically arranged in the form of an inner ring and an outer ring about an axis corresponding to the optical axis and the pole means are radially disposed on the rings with the first and fourth pole means located on the inner ring in radially outwardly facing direction and the second and third pole means located on the outer ring in radially inwardly facing direction and with the first and third pole means lying substantially in such one common plane arranged crosswise of the axis and the second and fourth pole means lying substantially in such other common plane arranged crosswise of the axis in axially spaced disposition to the one common plane (see FIGS. 3 to 6).

In further regard to such ring component embodiments, the field coil means advantageously includes a toroidal or doughnut shaped coil, preferably disposed in a housing forming a magnetic flux return flow path for the current through the coil.

To accommodate one type shutter assembly or light admitting system, the pole means and permanent magnets as well as the field coil means may be conveniently coordinately and cooperatively dimensioned and arranged to extend cumulatively in radial direction relative to the optical axis, whereby to provide an axially pronounced and radially minimized composite annular apparatus.

On the other hand, to accommodate another type shutter assembly or light admitting system, the pole means and permanent magnets as well as the field coil means may be conveniently alternatively coordinately and cooperatively dimensioned and arranged to extend cumulatively in axial or coaxial direction relative to the optical axis, whereby to provide a radial pronounced and axially minimized composite annular apparatus.

It will be realized that the foregoing specification and accompanying drawings are set forth by ways of illustration and not limitation, and that various changes and modifications may be made therein without departing from the spirit and scope of the present invention which is to be limited solely by the scope of the appended claims.

What is claimed is:

1. Photographic camera light controlling apparatus for electromagnetically driving a light admitting system of the type having diaphragm aperture and/or shutter exposure blades which are guided for translatory motion or mounted for rotary motion to admit photographic light to the camera along the optical axis thereof, comprising four spaced apart stator electromagnetic pole means defining therebetween an intervening field space containing a linear path and including first and second transversely opposed stator pole means disposed at opposite sides of such path at one linear end of the path and third and fourth transversely opposed stator pole means disposed at opposite sides of such path at the other linear end of the path and linearly spaced from the first and second pole means, such that the linear path extends from the first and second pole means at the one end of the path to the third and fourth pole means at the other end of the path and is laterally bounded on one transverse side of the path by the first and third pole means and on the opposite transverse side of the path by the second and fourth pole means, field coil means for electromagnetically energizing the four pole means and arranged for energization alternately in one current flow direction and in the opposite current flow direction and coordinated with the four pole means to energize the first and fourth pole means with one polarity and the second and third pole means with the opposite polarity and alternately to energize the first and fourth pole means with such opposite polarity and the second and third pole means with such one polarity and thereby providing in the intervening field space containing such path oppositely polarized electromagnetic fields which are generated in concordance with the change in current flow direction of the field coil means, a permanent magnet adapted for operative driving connection with the light admitting system to admit photographic light to the camera and arranged for reciprocal movement along the linear path between the four stator pole means and having the corresponding North and South permanent magnet poles thereof arranged in opposed relation to each other transversely of the linear path and forming a surface magnetized permanent magnet with one permanent magnetic pole facing toward the first and third pole means and the opposite permanent magnet pole facing toward the second and fourth pole means, for permitting the permanent magnet to move reciprocally linearly between a fully immersed electromagnetic field position transversely between the first and second pole means at one end of the path and a fully immersed electromagnetic field position transversely between the third and fourth pole means at the other end of the path, and one stop means in the vicinity of the first and second pole means at the one end of the path and another stop means in the vicinity of the third and fourth pole means at the other end of the path, the stop means being arranged to stop the movement of the permanent magnet in the corresponding movement direction at a selective corresponding point in the path within the operative range of the electromagnetic field of the transversely opposed pole means at the corresponding end of the path thereat and prior to the reaching of the fully immersed position of the permanent magnet transversely between the opposed pole means at that end of the path, the permanent magnet having sufficient magnetic field strength to urge itself toward such fully immersed position at the respective stop means and thereby independently self-retaining its disposition thereat after deenergization of the field coil means.

2. Apparatus according to claim 1 wherein a plurality of sets of such four corresponding spaced apart stator electromagnetic pole means is provided for defining a corresponding plurality of such field spaces and paths, said field coil means being arranged for correspondingly coordinately electromagnetically energizing the four pole means of each such set, and a corresponding plurality of such permanent magnets arranged for common reciprocal movement is provided respectively for such sets of four pole means.

3. Apparatus according to claim 2 wherein two ring shaped soft iron stator components are provided and such sets of stator pole means are formed correspondingly on the stator components in circumferentially spaced apart relation with the first and fourth pole means of each set in spaced apart disposition on one component and the second and third pole means of each set in spaced apart disposition on the other component and with the first and third pole means lying substantially in one common plane and the second and fourth pole means lying substantially in another common plane spaced from the one plane and disposed in corresponding opposed facing relation to the first and third pole means thereat and thereby defining the corresponding field space therebetween containing the linear path, and wherein a drive member adapted for operative driving connection with the light admitting system to admit photographic light to the camera is arranged for corresponding reciprocal movement and such permanent magnets are mounted on the drive member in corresponding circumferentially spaced apart relation for common reciprocal movement respectively between the corresponding sets of four stator pole means along the corresponding linear paths.

4. Apparatus according to claim 3 wherein the stator components are substantially concentrically arranged in the form of an inner ring and an outer ring about an axis corresponding to the optical axis and the pole means are radially disposed on the rings with the first and fourth pole means located on the inner ring in radially outwardly facing direction and the second and third pole means located on the outer ring in radially inwardly facing direction and with the first and third pole means lying substantially in such one common plane arranged crosswise of the axis and the second and fourth pole means lying substantially in such other common plane arranged crosswise of such axis in axially spaced disposition to the one common plane.

5. Apparatus according to claim 3 wherein the pole means and permanent magnets are cooperatively arranged to extend in radial direction relative to the optical axis.

6. Apparatus according to claim 3 wherein the pole means and permanent magnets are cooperatively arranged to extend in axial direction relative to the optical axis.

7. Apparatus according to claim 3 wherein the field coil means include a toroidal coil disposed in a housing forming a magnetic flux return flow path for the current through the coil.

8. Apparatus according to claim 1 wherein the corresponding stop means are selectively adjustable to vary the respective point in the path at which the corresponding movement of the permanent magnet is stopped.

9. Photographic camera light controlling apparatus for driving a light admitting system, comprising at least one set of four spaced apart stator electromagnetic pole means correspondingly defining therebetween an intervening field space containing a linear path, such corresponding stator set including first and second transversely opposed pole means at one end of the path and third and fourth transversely opposed pole means at the other end of the path, with the first and third pole means arranged on one lateral side of the path and the second and fourth pole means arranged on the opposite lateral side of the path, field coil means energizable alternately in opposite current flow directions and coordinated with the corresponding stator set to energize the first and fourth pole means with one polarity and the second and third pole means with the opposite polarity, and alternately vice versa, thereby providing in such field space corresponding oppositely polarized electromagnetic fields, permanent magnet means arranged with respect to the corresponding stator set for reciprocal movement along the path for driving such light admitting system, having its permanent magnet poles arranged transversely of the path and forming a surface magnetized permanent magnet with one permanent pole facing towards the corresponding first and third pole means and the opposite permanent pole facing towards the corresponding second and fourth pole means, and disposed for permitting the permanent magnet to reciprocate along the path from a fully immersed electromagnetic field position substantially between the corresponding first and second pole means to a like position substantially between the corresponding third and fourth pole means, and a corresponding stop means at each path end to stop the corresponding permanent magnet at a point within the operative field range of the corresponding opposed stator pole means at the corresponding path end before reaching the fully immersed position thereat, the corresponding permanent magnet having sufficient field strength to urge itself toward such corresponding fully immersed position for independent self-retention at the respective stop means thereat after field coil means de-energization.

10. Apparatus according to claim 9 wherein the corresponding stop means are selectively adjustable to vary the respective point in the path at which the corresponding reciprocal movement of the corresponding permanent magnet is stopped.

* * * * *